(12) United States Patent
Rothen

(10) Patent No.: US 8,551,276 B2
(45) Date of Patent: Oct. 8, 2013

(54) LAMINATING PROCESS AND APPARATUS FOR APPLYING AN ADHESIVE-COMPOSITION FILM TO A WEB-LIKE SUBSTRATE

(75) Inventor: Josef Rothen, Solingen (DE)

(73) Assignee: Illinois Tool Works, Inc., Glenview, IL (US)

( * ) Notice: Subject to any disclaimer, the term of this patent is extended or adjusted under 35 U.S.C. 154(b) by 691 days.

(21) Appl. No.: 12/520,255

(22) PCT Filed: Dec. 20, 2007

(86) PCT No.: PCT/EP2007/011280
§ 371 (c)(1),
(2), (4) Date: Sep. 17, 2010

(87) PCT Pub. No.: WO2008/074508
PCT Pub. Date: Jun. 26, 2008

(65) Prior Publication Data
US 2011/0126971 A1 Jun. 2, 2011

(30) Foreign Application Priority Data
Dec. 20, 2006 (DE) .......................... 10 2006 060 954

(51) Int. Cl.
*B32B 37/04* (2006.01)
(52) U.S. Cl.
USPC .......................................... 156/242; 156/501
(58) Field of Classification Search
USPC ....................................................... 156/242
See application file for complete search history.

(56) References Cited

U.S. PATENT DOCUMENTS

| 3,630,802 | A | * | 12/1971 | Dettling | ......................... 156/231 |
| 3,867,901 | A | | 2/1975 | Greiller | |
| 4,611,759 | A | * | 9/1986 | Cox | ............................... 239/229 |
| 4,830,887 | A | * | 5/1989 | Reiter | ........................... 427/420 |
| 4,974,533 | A | * | 12/1990 | Ishizuka et al. | ............... 118/411 |
| 5,206,057 | A | * | 4/1993 | Finnicum et al. | ............. 427/420 |
| 5,833,792 | A | * | 11/1998 | Funaki et al. | ............. 156/244.27 |
| 7,169,445 | B2 | * | 1/2007 | Gueggi | ......................... 427/420 |

FOREIGN PATENT DOCUMENTS

| DE | 197 35 588 A1 | 2/1999 |
| DE | 100 12 346 A1 | 9/2001 |
| EP | 0 778 127 A2 | 6/1997 |
| EP | 0 836 927 A1 | 4/1998 |
| WO | 96/25902 A | 8/1996 |
| WO | WO 96/25902 | 8/1996 |
| WO | 97/40947 | 11/1997 |
| WO | WO 9740947 A1 * | 11/1997 |
| WO | WO 98/47630 | 10/1998 |
| WO | WO 99/28048 | 6/1999 |

* cited by examiner

*Primary Examiner* — Philip Tucker
*Assistant Examiner* — Vicki Wu
(74) *Attorney, Agent, or Firm* — Rankin, Hill & Clark LLP

(57) ABSTRACT

A laminating process in which an adhesive composition which is freely flowing or can be rendered freely flowing is discharged from a coating appliance in the form of a substantially continuous or interrupted film, out of a slot nozzle with lateral film boundaries, and is applied and fixed to the surface of at least one web-type substrate, if applicable after being deposited on an advancing transfer substrate, such as a roller, and then transferred to the web-type substrate, and in which the film is guided outward to the substrate via the nozzle slot, clamped or hemmed in at its edges by the film boundary elements, heat is drawn off to the surrounding atmosphere via at least one heat exchange element provided along the film boundary elements.

26 Claims, 2 Drawing Sheets

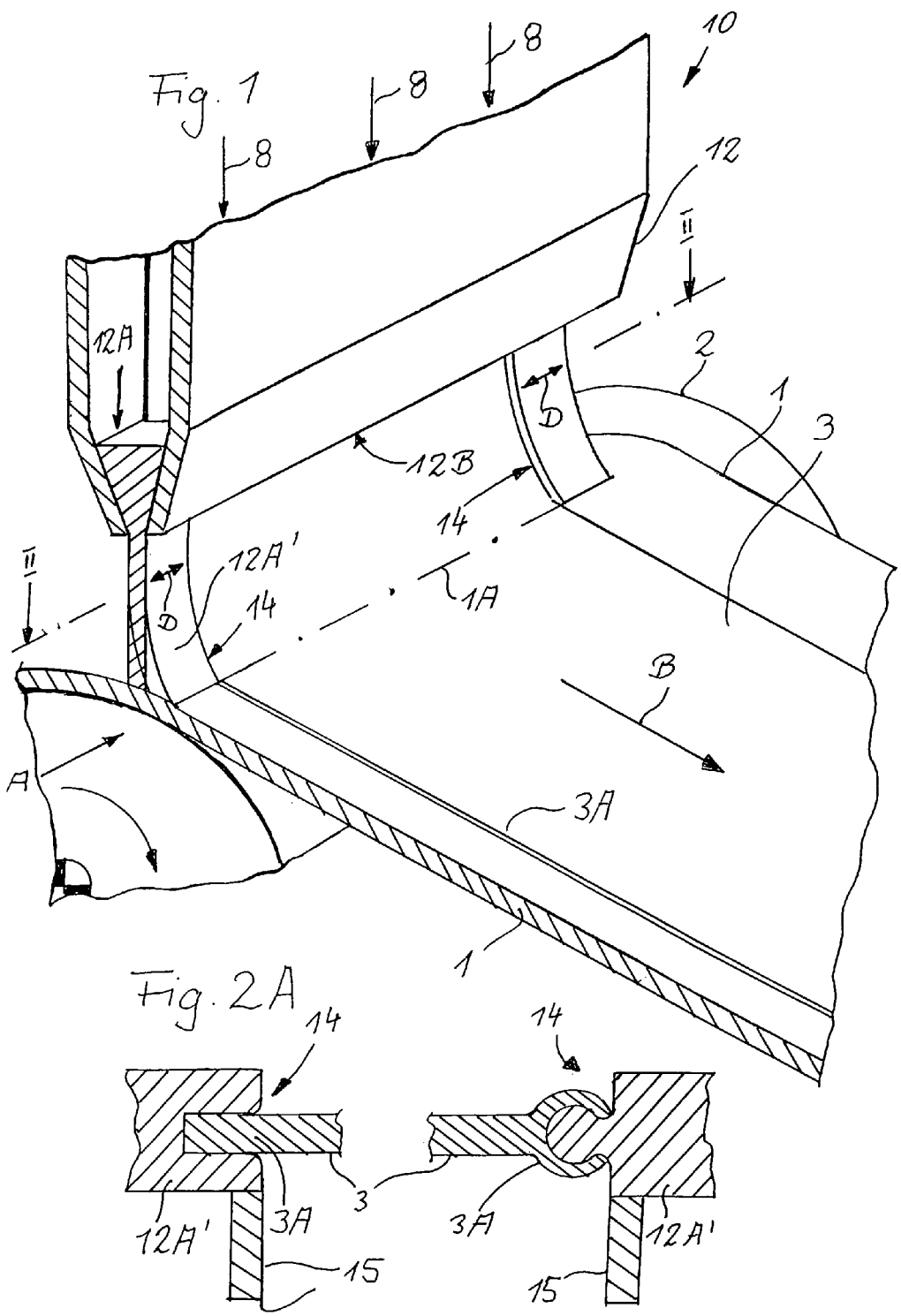

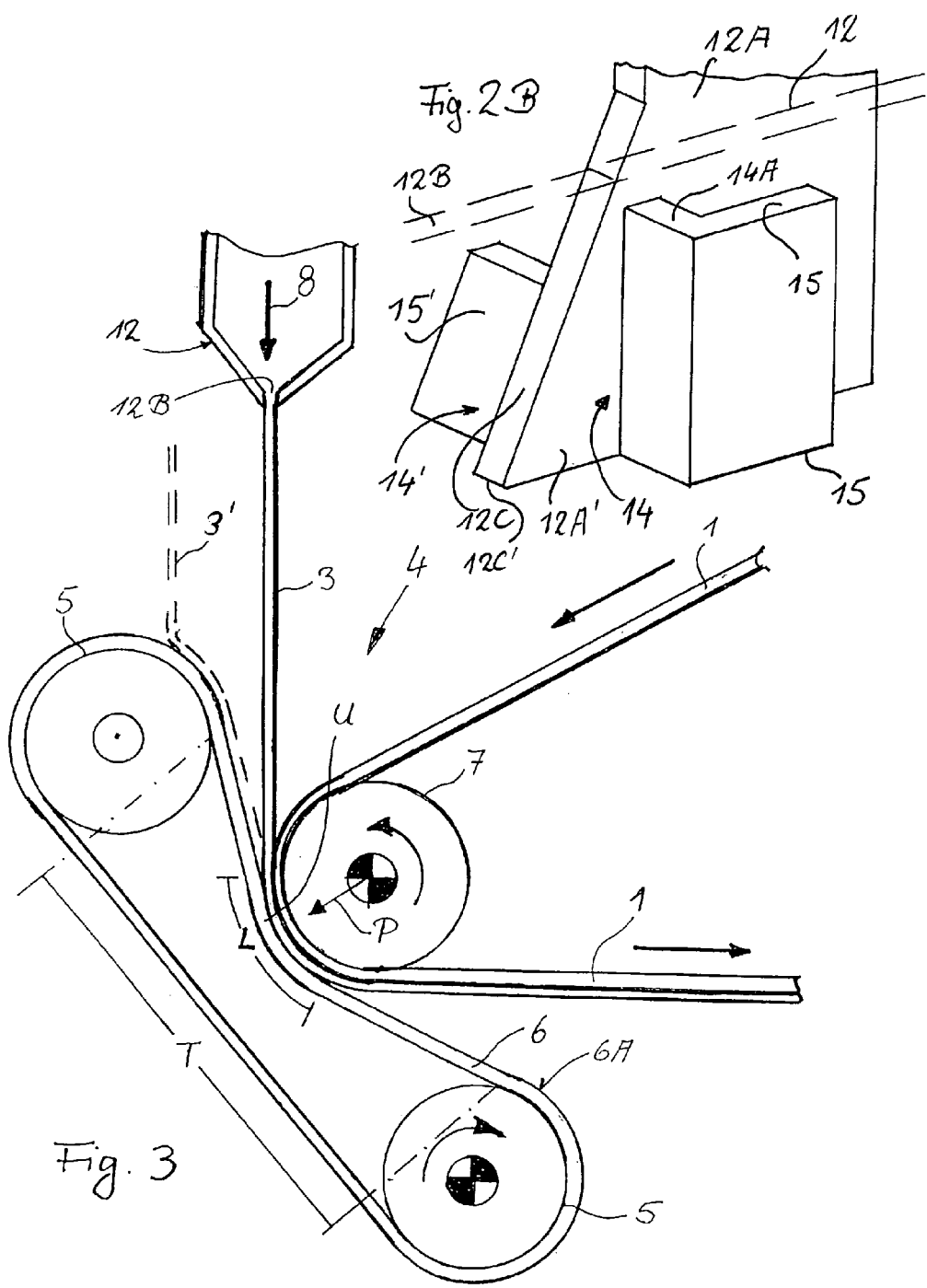

LAMINATING PROCESS AND APPARATUS FOR APPLYING AN ADHESIVE-COMPOSITION FILM TO A WEB-LIKE SUBSTRATE

This application claims priority to and the benefit of the filing date of International Application No. PCT/EP2007/011280, filed Dec. 20, 2007, which application claims priority to and the benefit of the filing date of German Application No. 10 2006 060 954.9, filed Dec. 20, 2006.

SUBJECT OF THE INVENTION

The invention relates to a laminating process in which an adhesive composition which is freely flowing or is rendered freely flowing, especially a hot-melt adhesive, is discharged from a coating appliance in the form of a substantially continuous or interrupted film, and is applied and fixed to the surface of at least one web-type substrate, if applicable after being discharged onto an advancing transfer substrate, such as a roller, and then transferred to the web-type substrate, and a corresponding laminating apparatus.

TECHNICAL BACKGROUND

Laminating processes and laminating apparatuses of this type are known, for example, from WO96/25902 and WO99/28048. Whereas WO96/25902 provides for the continuous film of an adhesive composition to be applied to a first substrate without contact between said substrate and the application device, after which a second substrate is placed on the continuous adhesive composition film, and then this three-layer composite is guided through a compression gap between two rollers that are pressed against one another, in order to force any air out from between the two substrates and the adhesive film, WO99/28048 provides for the adhesive film to be applied to a first web-type substrate and then pressed onto the substrate by guiding the web-type substrate, along with the continuous adhesive film, through a compression gap between two rollers pressed against one another. The second substrate is applied to the adhesive coated side only after the above step, and is pressed on in another compression gap formed by two pressure rollers. While it is desirable in the process known from these two publications to apply the continuous adhesive composition film to the first substrate without contact between the coating appliance and the substrate or a roller, other processes described in these two publications are implemented with contact, for example using an oscillating or application roller or other direct contact method, for example with direct contact between a slot nozzle and the first substrate.

Using a compression roller gap to press the continuous adhesive composition film onto one or both of the substrates results in an uneven distribution of the adhesive film over the at least one substrate, because the substrate is at least microscopically irregular, and in some cases is also macroscopically irregular, on its surface to be laminated. In the compression gap, a film of uneven thickness is formed from the initially substantially uniform adhesive composition film, in that the freely flowing constituents of the adhesive composition accumulate in "troughs" in the substrate surface, whereas adhesive is forced away from the protruding "peaks" or "ridges" in the surface structure of the substrate toward the "troughs." This adversely affects the adhesive capacity of the laminate and/or other properties, such as the clarity of the transparency of a transparent laminate substrate.

The contactless application process, so-called "curtain coating," involves another problem with the uniformity of application thickness along the lateral edges of the adhesive composition film, because the film contracts from its lateral edges toward the center (so-called "neck in") as it travels from the slot nozzle to the substrate. As a result, a line of significantly thicker coating becomes deposited on the substrate along the application edges of the film. This is unacceptable when the web-type substrate is wound onto a reel—even if the difference in thickness as compared with the web center is only slight. These thicker edges must be cut away by cutting the web lengthwise, and must be discarded as waste. Thus in this case, both substrate material and adhesive composition are irretrievably lost.

SUMMARY OF THE INVENTION

In order to improve the uniformity of an adhesive film following its application onto a web-type substrate, a laminating process and a laminating apparatus having a composition which is freely flowing or can be rendered freely flowing that is discharged from a coating appliance in the form of a substantially continuous or interrupted film out of a slot nozzle with lateral film boundaries. This film being applied and fixed to the surface of at least one web-type substrate such as a roller in which the film is guided outward to the substrate via the nozzle slot, clamped or hemmed in at its edges by the film boundary elements. Heat is drawn off to the surrounding atmosphere via at least one heat exchange element provided along the film boundary elements. Accordingly, the adhesive composition film is guided onto the substrate in a state in which it is externally clamped or hemmed in at its edges by the film boundary elements via the nozzle slot.

According to one aspect of the invention, so-called "neck in" is eliminated. It is nevertheless possible to thinly draw out the adhesive composition film that is discharged at the nozzle slot as it travels to the substrate, and to thereby influence the application thickness, in particular making it especially thin.

Various additional measures may be implemented so as to better hold the longitudinal side edge of the adhesive composition film on the film boundary elements, which project outward above the slot nozzle. According to another aspect of the invention, one of these other measures includes cooling the film along the clamping path. This can be accomplished by using especially vane-type heat exchange elements, which are in thermally conductive connection with the film boundary elements. To this end, the heat exchange elements can be equipped with cooling channels, or can be connected in a thermally conductive fashion. Alternatively or additionally, compressed air can be directed toward the film edge for cooling and/or for generating vacuum pressure and/or for stretching the film laterally. In addition or as an alternative to these measures, it is possible for profiled guide edges to be used for hemming in or clamping the lateral edges of the film, such as groove-like or dove-tailed guide profiles, or guide profiles having channels, folds or the like. Preferably, the heat exchange elements are not also used as guide edges, and are therefore preferably not wetted with the adhesive composition.

"Clamping" the adhesive film within the context of the invention refers to a situation in which transverse forces act on the film material in the direction of its edges. "Hemming in" refers to a situation in which the lateral film edges are guided without tension. In both cases, the film edges are guided. A "substantially continuous" film within the context of the invention means that the film is closed, i.e., without interruptions, and, if applicable, is also waterproof. An "interrupted" film within the context of the invention is a film that is interrupted to some degree. Such interruptions can be larger or smaller depending upon the specific application, and in extreme cases may not be perceivable by the naked eye, while air and/or water are both able to penetrate this film.

The film boundary elements that project beyond the nozzle slot in the direction of the substrate can be embodied as relatively rigid or as flexible to some extent. They can end shortly in front of the substrate, or can also brush up against the substrate. With most substrates the latter will not cause damage, particularly since in most cases the substrate edge will be discarded later anyway.

Lip-type film boundary elements are known in the prior art (U.S. Pat. Nos. 3,867,901 A, 4,830,887 A, WO 98/47 630). U.S. Pat. Nos. 3,867,901 and 4,830,887 A describe the "curtain coating" of photographic film material with photographic coating compositions, in which a low-viscosity film of the photographic coating composition flows by virtue of gravity over a curved overflow surface with a tear-off edge. Lateral film boundary elements are used to guide this free-falling film. U.S. Pat. No. 4,830,887 A proposes connecting the film boundary elements as a hollow channel with a longitudinally extending connection slot to the film of the photographic coating composition, and holding this under negative pressure so as to suction off excess material of the low viscosity fluid, if applicable allowing this to be reused. It has been found that constructions of this type cannot be used in combination with heated adhesive compositions that are discharged under pressure from a slot nozzle, such as hot melt adhesives. The application processes for dispersions, for example of aqueous pressure-sensitive adhesives, known from WO 98/47 630, also are not suitable for purposes of lamination using hot melt adhesives and other comparably viscous adhesives. This document proposes feeding a supplementary fluid in via an infeed channel to improve the sliding properties between the suspended low viscosity film and the lateral film boundary elements. With infeed fluids of this type, consumable material is also lost in the process.

In order to also improve the uniformity of the adhesive film in the remaining area, i.e., in the area lying beyond its edges, another aspect of the invention includes a pressing belt which circulates among a plurality of turning elements as the pressing means, along with at least one additional turning means, with which the at least one substrate or the adhesive composition is held in position on the pressing belt over a running length, such that an additional turning of the pressing belt results, wherein the at least one additional turning means preferably is or are arranged in the area of a partial length of the pressing belt, which is situated between two of the turning elements of the pressing belt. This aspect of the invention is also not found in the prior art.

It has been found that with a pressing device of this type, the circulating pressing belt is already flexible crosswise to its direction of travel due to the flexibility required for it to turn around the turning elements; said flexibility significantly decreases the unevenness of the pressed-on adhesive film known from the prior art.

It is now possible to adapt generic processes and apparatus to specific applications differently, and/or also to further increase the microscopic uniformity of the adhesive film thickness.

In contrast to the process of compression rolling from the elastic material or with the elastic coating, in which the so-called nip, i.e., the length of the compression zone in the direction of travel is relatively highly dependent upon other operating parameters of the compression device and upon the materials and material thicknesses used for the substrates and the adhesive films and upon compression pressures, the length of the nip in the present invention is influenced to a comparatively small degree by the aforementioned variables. According to the invention, comparatively long nips can be realized, resulting in better protection for the substrates and for the adhesive film.

To make the result of the adhesive coating as reproducible as possible, it is advantageous to use a pressing belt with limited extensibility.

If the circulating pressing belt is embodied as particularly flexible crosswise to its direction of travel, further uniformity of the adhesive film thickness on the at least one substrate in its pressed on state is achieved.

The laminating process of the invention and the laminating apparatus of the invention are both possible for the contactless as discharge of the continuous adhesive composition film from the discharge device onto the substrate, as is described in WO96/25902 and WO99/28048 and in other publications, for example. In principle, however, an adhesive composition film may also be delivered in such a way that the discharge device is in contact with the substrate. It is also an option to first cover the first substrate that has been provided with the continuous adhesive composition film with an additional web-type substrate, and then to perform the pressing process in accordance with the invention. It is particularly advantageous for the continuous adhesive composition film to be pressed on following its application to the first web-type substrate. A product of this type can also be used at a later time for lamination without itself requiring a laminate layer, wherein the adhesion of the adhesive composition on the first substrate is enabled. It is also within the scope of the present invention for adhesive to be omitted from the adhesive composition film in specific areas in which no adhesive is required on the substrate.

The aforementioned components to be used according to the invention, along with the components that are claimed and those that are described in the exemplary embodiments, are subject to no specific exceptional conditions with respect to their size, shape, material selection and technical design, so that the selection criteria that are known in the area of application can be used without restriction.

Further details, characterizing features and advantages of the subject of the invention are described in the dependent claims and in the following description of the associated drawings and table, in which an exemplary embodiment of a laminating apparatus is represented by way of example.

BRIEF DESCRIPTION OF THE FIGURES

Further details, characterizing features and advantages of the subject of the invention are described in the dependent claims and in the following description of the associated drawings and table, in which an exemplary embodiment of a laminating apparatus is represented by way of example.

Further, the foregoing, and more, will in part be obvious and in part be pointed out more fully hereinafter in conjunction with a written description of preferred embodiments of the present invention illustrated in the accompanying drawings in which:

FIG. 1 is a perspective view of an apparatus for applying an adhesive composition film to a web-type substrate FIG. 2A is a sectional representation of the film in the area between a slot nozzle and a substrate—corresponding approximately to Section II-II of FIG. 1—with two different film boundary elements in a laminating apparatus for applying an adhesive composition film to a web-type substrate, FIG. 2B is a perspective view of an alternative embodiment of a film boundary element and FIG. 3 is a side view of a laminating apparatus with pressing belt, corresponding approximately to view A of FIG. 1.

DETAILED DESCRIPTION OF EXEMPLARY EMBODIMENTS

Referring now in greater detail to the drawings wherein the showings are for the purpose of illustrating preferred embodiments of the invention only and not for the purpose of limiting the invention, FIG. 1 illustrates a section of a coating appliance, which is identified as a whole by the number 10, in which the slot nozzle 12 is most obvious, wherein film boundary elements 12A are arranged on both sides in the nozzle slot 12B, for the purpose of delimiting the nozzle gap or slot on both sides. Double arrows D indicate the displacement directions of the film boundary elements along the nozzle slot 12B. Each film boundary element 12A has an extension 12A', which in the drawing is lip-like and oriented over the narrow section of the nozzle slot 12B toward the outside in the direction of a web-type substrate 1. In one embodiment which is shown in the sectional representation in FIG. 1, extension 12A' can extend linearly. In this embodiment, the extension can be a rigid extension to help maintain a desired orientation of the extension. In another embodiment, extension 12A' can be somewhat flexible and can follow a curved path—dependent upon the ratio of the length of the extension to the distance of the nozzle slot 12B from the substrate 1 and/or the flexibility of the extension. In this embodiment, the extension will curve in the direction of movement B of the web-type substrate 1, as is illustrated by way of example in FIG. 1. In yet other embodiments, extensions 12A' can have a profiled guide edge 14, such as is shown by way of example in FIG. 2A or 2B and one or more of the guide edges can be utilized in the invention of this application.

In FIG. 2A, the profiling of the guide edge in the left half of the drawing is configured as a groove, and in the right half of the drawing is configured as a land, wherein the concrete exemplary embodiment looks like beading in cross-section. The purpose of the profiling is to improve the guidance and securing of the lateral edges 3A of a film 3 of a freely flowing adhesive composition on the film boundary elements.

FIG. 2B shows a perspective view of yet other embodiments of the invention of this application. In this respect, shown is a film boundary element 12A. Below the nozzle slot 12B of the slot nozzle 12, indicated by dashed lines, an extension 12A' of the film boundary element 12A extends, directed toward the substrate, which is not shown here. Its film boundary surface 12C, which produces yet another profiling of the edge. Surface 12C borders the adhesive composition film, not shown in the drawing, that is not right-angled in this embodiment, but is beveled at an angle toward the inside with respect to the nozzle slot 12B. This profiling produces a widening of the adhesive composition film to be produced toward the slot nozzle 12 so that the transverse forces in the film plane (transversely to the direction of flow of the film) as it proceeds toward the substrate can be at least partially relieved. In this manner, the corresponding forces acting on the lower tear-off edge 12C' of the film boundary surface 12C can be advantageously decreased. As with the embodiments discussed above, surface 12C can also include profiling edge which can be a groove-shaped profiling.

The coating appliance can further include a heat exchanger to control the temperature of one or more components of the coating appliance. For example, the heat exchanger can be utilized to control extension(s) 12A'. In FIG. 2B, shown is a heat exchange vane 15, which serves as a heat exchange element, is connected to the guide leg 14A extending between vane 15 and extensions 12A' thereby maintaining the orientation of extension 12A', oriented as a continuation of the groove-shaped profiling of the guide edge 14, and essentially is no longer surface coated by the adhesive composition film. In the exemplary embodiment, this heat exchange vane 15 is cut away or ventilated at the back with respect to the extension 12A', allowing optimal heat exchange. The heat of the hot adhesive composition present in the groove-shaped profiling 14 is thereby effectively drawn off, so that the adhesion of the edges of the adhesive composition film to the guide edge 14 is sufficient to essentially completely prevent a neck-in of the film. An additional heat exchange vane 15' is represented solely by way of example on the opposite side of the extension 12A', said vane extending approximately parallel to but offset from the film boundary surface 12C, and extending in thermally conductive contact with the film boundary surface 12C and the optional additional guide edge 14'.

As is also apparent in FIG. 1, a web-type substrate 1, such as a web of recycling paper, is advanced in direction of travel B over a roller 2, around part of which the web-type substrate 1 is wrapped. A melted adhesive composition 8, is forced into the nozzle slot 12B via pressure, is discharged from the nozzle gap 12B in the form of a thin, highly flexible film 3, which is guided onto the web-type substrate 1, clamped between the parts of the film boundary elements 12A which project beyond the nozzle slot. In the embodiment shown, the line of contact 1A, a dotted-dashed line, is located approximately at the end of the wraparound area of the substrate 1 around the driven roller 2. A similar transfer position for the film 3 is indicated by dashed lines in FIG. 3 as another alternative embodiment. The film 3 and the substrate 1 are depicted as unusually thick in the drawings so as to improve the clarity of the illustration. A thickening of the film 3 in the area of the film edges 3A, as is known in the prior art, and a neck in toward the center of the web, in other words a decrease in width as compared with the discharge dimensions of the nozzle slot, does not occur.

FIG. 3 illustrates the way in which a film 3 of an adhesive composition 8, which is discharged from a slot nozzle 12, can be pressed together with a web-type substrate 1 so as to form a laminate. As the pressing device 4, a pressing belt 6 which circulates around roller-type turning elements 5 is used, along with a turning means 7, which generates an additional deflection U in the pressing belt 6. The turning means 7, which in the drawing is represented as an especially rotationally driven roller, its preferred form, is arranged in the area of a partial length T of the pressing belt 6, situated between the turning elements 5. The extensibility of the pressing belt 6 is low enough that it will not yield excessively to the contact pressure P of the turning means 7, and that it will generate a sufficiently high reaction force on the area of pressure between the film 3 and the web-type substrate 1. With the deflection U of the pressing belt 6 in the area of the turning means 7, a relatively wide nip or running length L as compared with so-called nip roller pairs is created in the direction of web travel, thereby advantageously extending the period of action at the pressing point.

The circulating pressing belt can also be somewhat flexibly deformable crosswise to its direction of travel, if this corresponds to the material pairing (film 3/substrate 1) and the operating conditions, such as temperatures and travel speed, so as to improve quality. The pressing belt 6 can have a selected radially exterior surface, for example a surface treatment 6A or a surface coating, based upon its use. For example, a surface treated stainless steel belt can be used, if the film 3, as illustrated by way of example in the exemplary embodiment of FIG. 3, is in physical contact with the pressing belt 6 over the nip length.

While considerable emphasis has been placed on the preferred embodiments of the invention illustrated and described herein, it will be appreciated that other embodiments and/or equivalents thereof can be made and that many changes can be made in the preferred embodiments without departing from the principles of the invention. Accordingly, it is to be distinctly understood that the foregoing descriptive matter is to be interpreted merely as illustrative of the invention and not as a limitation.

The invention claimed is:

1. A laminating apparatus for discharging a substantially continuous or interrupted film of a plastic composition which is freely flowing or has been rendered freely flowing, and for applying the film to a web-type substrate, the apparatus comprising a coating appliance for applying a film onto an associated web-type substrate in which the coating appliance includes a slot nozzle which has opposite ends for the discharge of the freely flowing plastic composition for creating the film, the slot nozzle having at least one film boundary element at each of the opposite two ends, the at least one element projecting outward from the nozzle slot in the direction of the associated substrate and producing a clamp or hem in the lateral edges of the film during application of the film on the associated substrate, wherein the at least one film boundary element is located partly inside of the nozzle slot and extends outwardly therefrom.

2. The laminating apparatus of claim 1, further including a heat exchanger provided along the at least one film boundary element and the heat exchanger being in contact with the at least one boundary element in a thermally conductive fashion.

3. The laminating apparatus of claim 2, wherein the heat exchanger includes a vane-type heat exchange element.

4. The laminating apparatus of claim 1, wherein the film boundary elements include a profiled guide edge for hemming in or clamping the lateral edges of the film.

5. The laminating apparatus of claim 2, wherein the film boundary elements include a profiled guide edge for hemming in or clamping the lateral edges of the film, the heat exchanger being an extension of the profiled guide edge.

6. The laminating apparatus of claim 1, further including a pressing device for forcing air out from between the film and the associated substrate and for fixing the film onto the substrate, the pressing device including a pressing belt which circulates among a plurality of turning elements, at least one turning means with which at least one of the associated substrate and the film composition is held in position on the pressing belt over a running length such that an additional deflection of the pressing belt results.

7. The laminating apparatus of claim 6, wherein the at least one turning means is arranged in the area of a partial length of the pressing belt, which is situated between two of the turning elements of the pressing belt.

8. The laminating apparatus of claim 6, wherein the rotating pressing belt is elastically deformable crosswise to its direction of travel.

9. The laminating apparatus of claim 6, in which the circulating pressing belt includes at least one of a surface treatment and a surface coating for decreasing its adhesion to the at least one of the associated substrate and the film.

10. A laminating apparatus for discharging a substantially continuous or interrupted film of a plastic composition which is flowable for applying the plastic composition as a film on an associated web-type substrate having oppositely extending lateral film edges, the apparatus comprising a coating appliance having a nozzle for directing the plastic composition toward an associated substrate moving in a travel direction, the nozzle including a nozzle slot extending transverse to the travel direction between opposite two ends of the nozzle slot that are opposite to one another and being spaced from the associated substrate, the plastic composition being urged through the nozzle slot such that the nozzle slot forms the film, the nozzle slot having at least one film boundary element at each of the two ends and the at least one boundary element having an element extension extending outwardly from the nozzle slot toward the associated substrate, the at least one boundary element producing a clamp or hem in the lateral edges of the film during application of the film on the associated substrate, wherein the at least one film boundary element is located partly inside of the nozzle slot and extends outwardly therefrom.

11. The laminating apparatus of claim 10, wherein the element extension includes an inwardly facing profile guide edge that at least in part forms the lateral edges of the film.

12. The laminating apparatus of claim 11, wherein the guide edge includes a groove.

13. The laminating apparatus of claim 11, wherein the guide edge includes a land.

14. The laminating apparatus of claim 10, further including a heat exchanger provided along the element extensions and the heat exchanger being in contact with the element extensions in a thermally conductive fashion.

15. A laminating apparatus for discharging a substantially continuous or interrupted film of a plastic composition which is flowable for applying the plastic composition as a film on an associated web-type substrate having oppositely extending lateral film edges, the apparatus comprising a coating appliance having a nozzle for directing the plastic composition toward a transfer substrate advancing in a travel direction, the nozzle including a nozzle slot extending transverse to the travel direction between opposite two ends of the nozzle slot that are opposite to one another and being spaced from the transfer substrate, the plastic composition being urged through the nozzle slot such that the nozzle slot forms the film, the nozzle slot having at least one film boundary element at each of the two ends and the at least one boundary element having an element extension extending outwardly from the nozzle slot toward the transfer substrate, the at least one boundary element producing a clamp or hem in the lateral edges of the film during application of the film on the transfer substrate, wherein the at least one film boundary element is located partly inside of the nozzle slot and extends outwardly therefrom.

16. The laminating apparatus of claim 15, wherein transfer substrate includes a roller and the roller transfers the film onto an associated web-type substrate.

17. The laminating apparatus of claim 15, further including at least one heat exchange element provided along the at least one film boundary elements, the heat exchange element drawing off heat from the at least one boundary elements to the surrounding atmosphere.

18. The laminating apparatus of claim 15, further including a pressing belt that circulates among a plurality of turning elements in order to fix the film onto the substrate, the apparatus further including at least one turning means configured to hold in position the at least one substrate or the adhesive composition on the pressing belt over a running length such that a further deflection of the pressing belt results.

19. The laminating apparatus of claim 18, wherein the at least one turning means is arranged in the area of a partial length of the pressing belt, located between two of the turning elements of the pressing belt.

20. The laminating apparatus of claim 18, wherein the pressing belt is flexible crosswise to its direction of travel.

21. The laminating apparatus of claim 18, wherein the pressing belt includes a surface treatment or a surface coating for decreasing its adhesion to the substrate or the pressed on adhesive composition film is used.

22. The laminating apparatus of claim 1, further including at least one heat exchange element provided along the at least one film boundary elements, the heat exchange element drawing off heat from the at least one boundary elements to the surrounding atmosphere.

23. The laminating apparatus of claim 1, further comprising an advancing transfer substrate, the system first applying the film to the advancing transfer substrate and then onto the web-type substrate.

24. The laminating apparatus of claim 23, wherein the advancing transfer substrate includes a roller.

25. The laminating apparatus of claim 1, wherein the plastic composition is a hot melt adhesive.

26. The laminating apparatus of claim 1, wherein the at least one boundary element engages the associated substrate.

* * * * *